Jan. 19, 1960    M. T. REED, JR    2,921,700
CHAIN DRIVEN ELECTRIC TAILGATE LOADER
Filed Feb. 3, 1958    3 Sheets-Sheet 2
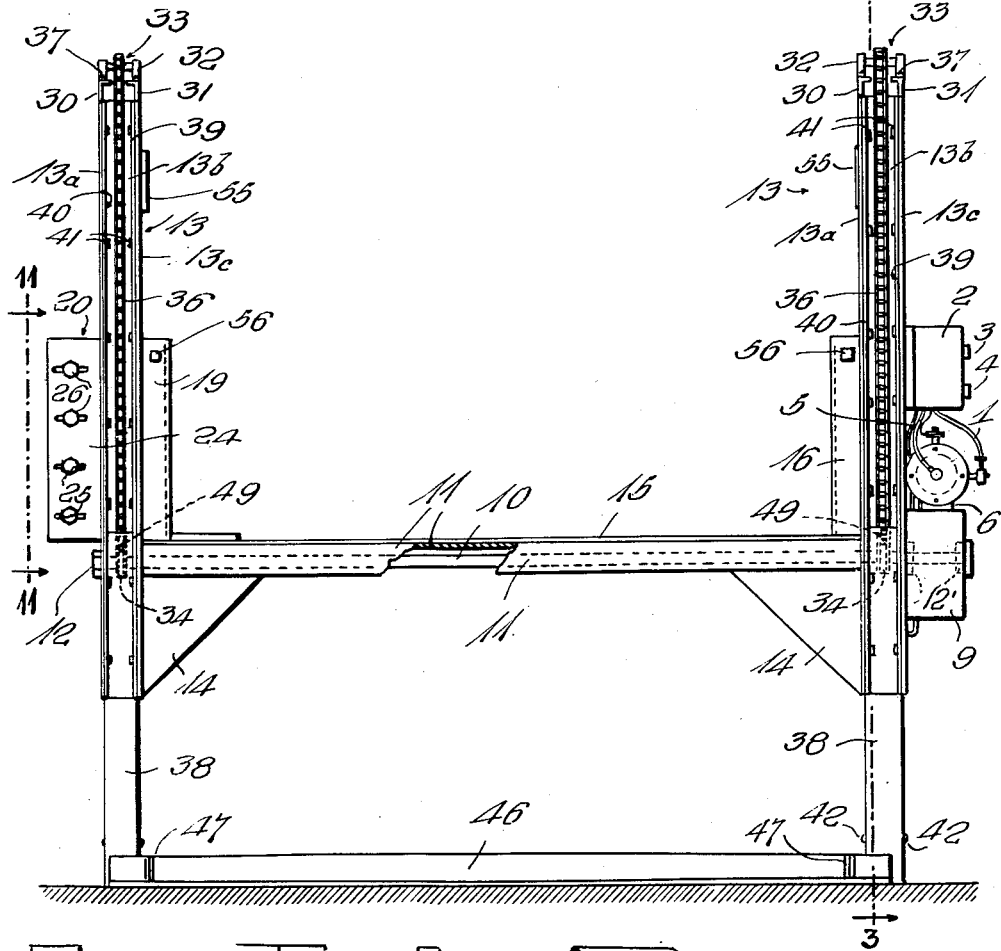
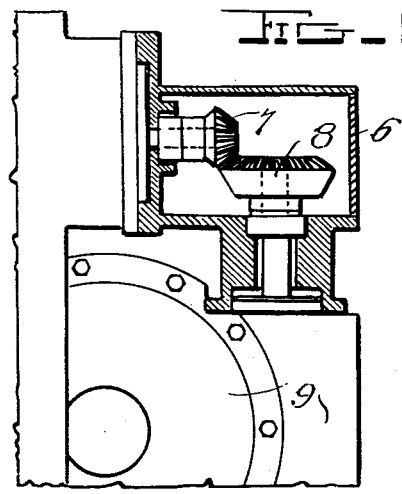
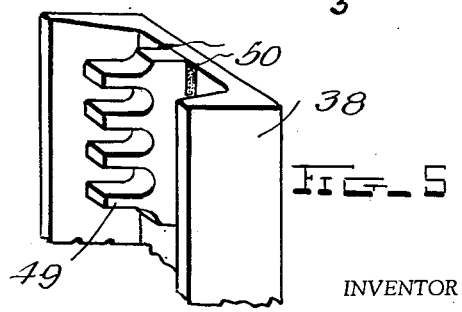
INVENTOR
Maurice T. Reed, Jr.,
BY
John S. Brady
ATTORNEY

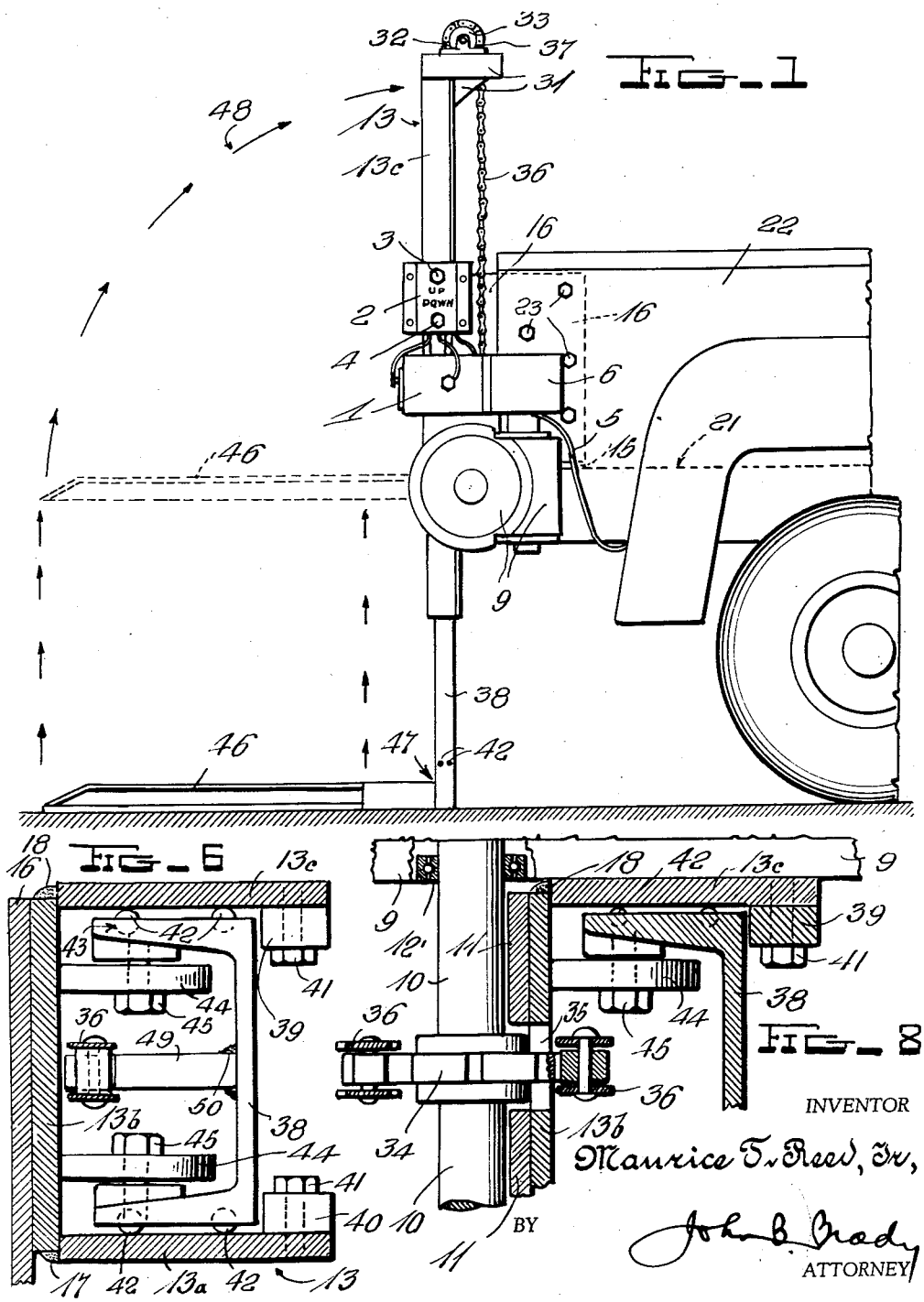

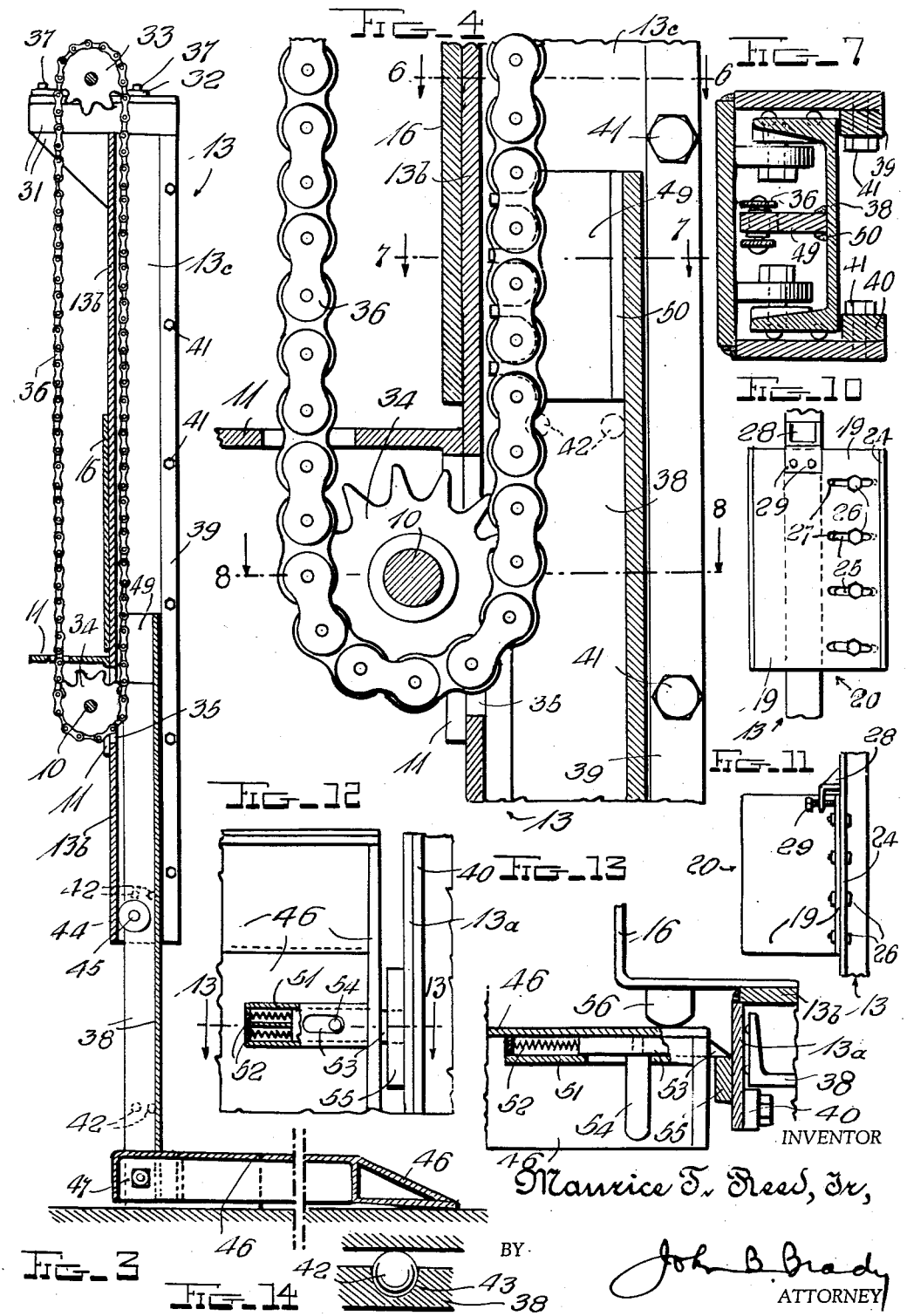

United States Patent Office 2,921,700
Patented Jan. 19, 1960

2,921,700
CHAIN DRIVEN ELECTRIC TAILGATE LOADER

Maurice T. Reed, Jr., Jackson, Miss.

Application February 3, 1958, Serial No. 712,784

5 Claims. (Cl. 214—75)

My invention relates broadly to truck tailgate loaders and more particularly to a chain driven electric tailgate loader wherein the chain drive controls the vertical movement of one channel member within another.

One of the objects of my invention is to provide a construction of chain driven electric tailgate loader which can be bolted onto the back of every make of American pick-up truck from the one-half ton class through the one and one-half ton class, as well as American stake body and flat bed trucks.

Another object of my invention is to provide a construction of chain driven electric tailgate loader in which manufacturing dimensions are not critical in order to obtain trouble-free operation.

Another object of my invention is to provide a construction of chain driven electric tailgate loader in which the movable portion of the tailgate loader is attached to the driving lift chains merely by means of simple notched steel bar members having teeth profiled to perfectly fit and slip into the driving lift chain links.

Still another object of my invention is to provide a construction of chain driven electric tailgate loader in which lift chain slippage is eliminated and lift chain wear is minimized.

Still another object of my invention is to provide a construction of chain driven electric tailgate loader in which a platform lift channel and a steel support channel combination on either side of the tailgate serve to fit within each other and protect the high wear parts thus eliminating the need for constant lubrication.

A further object of my invention is to provide a construction of chain driven electric tailgate loader in which equal lifting and lowering forces are supplied to both sides of the tailgate loader by means of a lift chain on each side of the tailgate driven by drive sprockets disposed on a common drive shaft.

Other and further objects of my invention reside in the manner in which free anti-frictional movement of one channel member within another is obtained and the simple economical construction of the entire lifting mechanism as set forth more fully in the specification hereinafter following by reference to the accompanying drawings, in which:

Fig. 1 is a side elevational view of the chain driven tailgate of my invention installed on a truck, and particularly showing the extreme lower and upper positions of the lift mechanism and the manner in which the lift platform is pivoted into the vertical plane to form the tailgate;

Fig. 2 is a back elevational view partly in section of the chain driven tailgate of my invention, particularly showing the two support channels containing platform lift channels controlled by lift chains driven by a common shaft;

Fig. 3 is a transverse sectional view taken substantially along line 3—3 of Fig. 2;

Fig. 4 is an enlarged view of a fragmentary portion of Fig. 3, particularly showing the manner in which the platform lift channel is coupled to the lift chain through the lift chain holder;

Fig. 5 is a perspective view of the top end of the lift channel carrying the lift chain holder;

Fig. 6 is a cross-sectional view taken substantially along line 6—6 of Fig. 4, particularly showing the construction of the load runner bearings and the close proximity of the lift chain holder to the back wall of the support channel;

Fig. 7 is a cross-sectional view taken substantially along line 7—7 of Fig. 4;

Fig. 8 is a partial cross-sectional view taken substantially along line 8—8 of Fig. 4 and particularly showing the manner in which the lower portion of the lift chain enters the interior of the support channel;

Fig. 9 is an enlarged elevational view partly in transverse section of a fragmentary portion of Fig. 1 and particularly showing the power mechanism components;

Fig. 10 is an elevational view of that face of the adjustable truck mounting angle plate which faces the truck body;

Fig. 11 is a side elevational view taken substantially along line 11—11 of Fig. 2;

Fig. 12 is a back vertical elevational view of the upper right hand corner of the tailgate lift platform when locked in the vertical plane and particularly showing the tailgate catch mechanism;

Fig. 13 is a horizontal sectional view taken substantially on line 13—13 of Fig. 12; and Fig. 14 is an enlarged sectional view of a typical fragmentary portion of the platform lift channel containing a lateral anti-friction channel ball and particularly showing the manner in which the magnetized ball is fitted into its bearing hole.

My invention is directed to a construction of electrically driven truck tailgate loader of the chain drive type which will bolt onto the body of a variety of truck types as a unit and operate on power received from the truck battery. An electric motor connected to the truck battery operates a gear reducer which has a drive shaft output extending across the rear of the truck. A drive sprocket is mounted on each side of the tailgate and each engages the lower end of a closed loop of lift chain. The top portion of the closed loops of lift chain engage sprockets mounted on top of support channel members and the chain is so mounted that half of the closed loop of chain is disposed within the support channel while the other half is disposed outside the support channel. A rolling platform lift channel is disposed within each support channel and attached to the lift chain by a lift chain holder. A tailgate lift platform is pivoted to the lower ends of the platform lift channels.

As power is supplied by the electric motor the drive sprockets which engage the lift chains actuate the lift chains thus turning them about the drive sprockets and associated top mounted sprockets. Since the lift chain holders are engaged by the lift chains they must move up or down in a vertical plane with the movement of the lift chains. Also, since the tailgate lift platform, platform lift channels, and lift chain holders move as one integral unit, the platform lift channels will slide up or down in a vertical plane, within the support channels, carrying the tailgate platform with them. The direction of movement in the vertical plane, that is, the up or down movement, is determined by the manipulation of the electrical controls which actuate the motor.

To form the truck tailgate the tailgate lift platform is electrically raised until it reaches the same level as the truck bed and then is manually pivoted on its pivot points from the horizontal plane into the vertical plane and locked in position.

Referring to the drawings in more detail, reference character 1 designates the D.C. motor electrically connected by wire 5 to the truck battery through electrical controls 2 which consist of cross-connected automotive type solenoids and control switches to actuate them as indicated by Up botton 3 and Down button 4. The power mechanism for the electrically driven tailgate loader of my invention consists of D.C. motor 1, gear box 6 and gear reducer 9. The D.C. motor 1, whose direction of rotation is controlled by buttons 3 and 4, is horizontally mounted to gear box 6 and coupled by means of gear box bevel gears 7 and 8 to gear reducer 9 on which the gear box is mounted. With this type assembly any possibility of motor lubrication difficulties and misalignment difficulties, such as are always present when motors are vertically mounted, are removed, since the motor is horizontally mounted. The output of gear box 6 is attached to a worm drive gear in the gear reducer which then drives the gear reducer gearing mechanism which in turn drives the gear reducer output drive shaft 10. Gear reduction and speed reduction is accomplished in both gear reducer 9 and in gear box 6. For illustrative purposes, gear box reductions can vary over a reduction ratio range from approximately 1:1 to approximately 1:6. The gear reduction of the gear reducer can be varied over a range of reduction ratios to give any commercially desirable rate of lift to the tailgate. Both the gear box and the gear reducer are completely sealed to retain original lubricant indefinitely.

Gear reducer output drive shaft 10 extends laterally across the rear width of the truck and is located beneath horizontal angle member 11. The drive end of drive shaft 10 is supported by gear reducer bearings 12', one of which is shown in Fig. 8, while the other end is supported in bearing 12 bracketed to support channel 13. A steel U-shaped support channel member 13 is welded normal to either end of the vertical side of horizontal angle member 11 which faces away from the truck cab to form the basic supporting structure for the electric tailgate. For purposes of a more simple and clearer explanation the two identical U-shaped support channel members 13 and other associated members of the two channel members which are correspondingly identical will be designated by similar reference characters. Support channel members 13 consist of members 13a, 13b and 13c welded at 17 and 18 to form channel members with a U-shaped cross-section. The U-shaped structure formed by the two support channel members 13 welded to horizontal angle member 11 is made more rigid by gusset plates 14 welded to the perpendicular channel members, bed plate 15 welded to the top of horizontal angle member 11 and truck mounting angle plate 16 welded to back 13b of right hand support channel member 13 (as seen in Fig. 2) and the top of bed plate 15.

The power mechanism components previously described are mounted on the right end of the U-shaped structure, as seen in Fig. 2, formed by the two support channel members 13 and the horizontal angle member 11 and the entire structure is mounted on the back edges of the truck bed 21 and body sides 22 by truck mounting angle plate 16, bed plate 15 and truck mounting angle plate 19 of the truck width adjustment assembly shown at 20. Bed plate 15 overlaps the rear edge of the truck bed 21 to form a broad mounting sill which protrudes into the rear of and lies flat against the truck bed. Truck mounting angle plate 16 fits flat against vertical truck body side 22 and is bolted to it as shown at 23. The left truck mounting angle plate 19 for the U-shaped structure as seen in Fig. 2 provides a truck with adjustment to allow a standard model of the electrically driven tailgate of my invention to be fitted to a variety of truck body types of the same general weight class having slightly different truck bed widths. Flat plate 24 welded to back 13b of left support channel member 13 of the U-shaped structure provides width adjustment slots shown at 25. Truck mounting angle plate 19 also provides width adjustment slots, shown at 27, which align in a vertical plane with slots 25 and partially or wholly align with slots 25 in a horizontal plane. The overlapping of slots 25 and 27 in the horizontal plane is dependent upon the truck bed width. Adjustment bolts 26 pass through the passage provided by the overlapping adjustment slots to secure plates 19 and 24 together and thus the left side of the U-shaped structure to the truck body. Tension clamp 28 welded to the back or left support channel 13 secures this support channel to truck mounting angle plate 19, by means of bolts 29, at their crossing point to eliminate excessive force on adjustment bolts 26 when the tailgate is under a load condition and to transfer an equal amount of pull to mounting angle plate 19 as is transferred to mounting angle plate 16 by the support channel to which it is welded. Welded to the top of each support channel member 13 are two top sprocket mounting base assemblies 30 and 31 to which is bolted top sprocket mount 32 which carries top sprocket 33 in bearings. Drive shaft 10 carries a drive sprocket 34 on each end thereof so located as to be aligned with the center axis of the support channel member 13. A rectangular slot 35 is provided in that portion of each back member 13b, of support channel member 13, that is adjacent to a drive sprocket 34 in order to allow a portion of said drive sprocket to protrude into the inside of the U-shaped support channel member. A closed loop of lift chain 36 is engaged by, and driven by, each pair of sprockets, that is, top sprocket 33 and drive sprocket 34, in such a way that half of said closed loop of lift chain 36 is vertically disposed within U-shaped support channel member 13 in close spatial relation to back member 13b, while the other half of said closed loop of lift chain is disposed outside support channel member 13 behind back member 13b. The function of top sprocket 33 is to serve as a return sprocket for lift chain 36. With this arrangement the direction of travel of the closed loop of lift chain is completely reversed on opposite sides of the sprockets when being driven by drive sprocket 34, thus eliminating any chance of chain slippage and operating the chain under conditions which minimize wear. Each top sprocket mount 32 is arranged to make it possible to increase or decrease the tension in chain 36 when necessary by placing or removing shims from between it and top sprocket mounting base assemblies 30 and 31. These shims may be just simple flat pieces of metal with holes in them to allow holddown bolts 37 of top sprocket mount 32 to go through them into sprocket mounting base assemblies 30 and 31.

Each U-shaped steel support channel 13 longitudinally encloses a platform lift channel 38 whose smaller U-shaped cross-section is inverted with respect to the U-shaped cross-section of support channel 13. On the open side of each support channel 13 there are two soft metal-retaining bars 39 and 40, bolted as shown at 41 to each support channel, which serve as anti-frictional runners for platform lift channels 38 as they move up and down in a longitudinal plane within and with respect to the support channels. With this construction the platform lift channels 38 in each of the support channels 13 are prevented from moving in any one of the four lateral directions and are thus restricted only to up and down movement.

The sides or legs of the U-shape of platform lift channels 38 each contain approximately three pairs of lateral anti-friction channel balls 42 disposed laterally on the external surface thereof at fixed symmetrical distances in depressions 43. These balls bear on the inside surface of the support channels and by rotating in their bearing holes 43 permit the lift channels to roll up and down within the support channels, thus decreasing friction and resulting in a freer working lifting mechanism requiring much less power to operate. The number of pairs of balls used depends upon the height that the tailgate is required to lift, the length of the lift chain loops 36, and the length of the support channels 13. The anti-friction channel balls are magnetized and since the greater volume of each ball 42 is back within its associated hole 43 in the lift channel surface they will not under any conditions be dislodged from or vibrate out of the lift channels when they are down below the support channels 13 where there is no bearing surface to retain the balls. The basic reason for using these balls is that they will provide trouble-free operation of the lift channels within the support channels even though the tailgate members are manufactured very haphazardly and dimensions are allowed to deviate widely. They are very inexpensive to insert in the lift channels and under test have proved to work very successfully.

Tailgate lift platform 46 is pivotally attached to the lower extremity of the two platform lift channels 38, as shown at 47, so that the tailgate lift platform can be pivoted in an arc, as indicated by arrows at 48, from a horizontal plane, in which it serves as a lift platform, into a vertical plane in which it serves as a truck tailgate.

A lift chain holder 49 is welded at 50 to the upper portion of and within the U of each platform lift channel 38. The lift chain holder consists of a notched bar of steel which has teeth so profiled as to perfectly fit into and engage the lift chain links. These teeth when engaged in lift chain 36, which is accomplished by merely slipping the chain into the lift chain holder, protrude beyond the center line of each lift chain link and the chain is prevented from coming out of the lift chain holder by both the friction angle on the teeth of the lift chain holder and support channel back member 13b which is in close spatial relation with the lift chain holder as shown in Fig. 6. With the teeth of the lift chain holders thus engaged in the lift chain links all vertical thrust of the lift chains as they are rotated by the torque of motor driven drive sprockets 34, in either an upward or downward direction, is absorbed by the lift chain holders which transfer it to the platform lift channels which in turn transfer it to the tailgate lift platform 46 causing it to travel in either an upward or downward direction.

Within the U of each platform lift channel 38 are mounted a pair of load runner bearings 44 attached to the lift channel so they may turn freely on heavy bolt axes 45. The function of these bearings is to provide an anti-friction device to compensate for the bending movement put in the platform lift channels by the load on the tailgate lift platform, thus preventing the platform lift channels from binding in the support channels. The load runner bearings 44 run against support channel back members 13b and serve to hold the platform lift channels in the proper location within the support channels so that lift chain holders 49 and lift chains 36 will not in any way bind on the support channels 13.

When tailgate lift platform 46 is being used as a truck tailgate, that is, after it has been manually pivoted into the vertical plane, it is locked in place by two catch mechanisms, one of which is shown in Figs. 12 and 13. A catch mechanism is provided on the bottom of each side of tailgate lift platform 46 in the vicinity of the outer edge thereof and each consists of a casing 51 containing springs 52 and spring-loaded slide bar 53 provided with catch handle 54. The end of each spring-loaded slide bar 53 engages the inside surface of a catch bar 55 securely attached to the outside surface of each steel U-shaped support channel 13 in the vicinity of the catch mechanism. Rubber bumper members 56 are provided on truck mounting angle plates 16 and 19 to provide a shock absorbing bearing surface for tailgate lift platform 46 when it is in the vertical position and also to insure a rattle-free tailgate in such a position since it is substantially wedged securely between bumpers 56 and catch bars 55 when it is locked in the vertical position. When the tailgate lift platform is in the up position the gate can be actuated electrically and moved up and down without jamming the mechanism since the spring-loaded slide bars 53 will merely slide along catch bars 55.

The upward movement and the downward movement of the electrically driven tailgate of my invention are respectively controlled by the Up button 3 and the Down button 4 of the electrical controls. The maximum height to which the tailgate should be raised and the maximum depth to which it should be lowered are indicated by lines drawn on the inside of the steel support channels 13 and on the platform lift channels 38. When the lines on the two channel members are aligned the maximum height or depth, whichever the case may be, has been reached and the actuating button should be released.

While I have described my invention in certain preferred embodiments, I realize that modifications may be made, and I desire that it be understood that no limitations upon my invention are intended other than may be imposed by the scope of the appended claims.

What I claim as new and desire to secure by Letters Patent of the United States is as follows:

1. A vehicle tailgate loader mechanism comprising in combination a stationary frame structure consisting of a support channel member of substantially U-shaped cross-section having substantially parallel disposed side walls interconnected by a rear wall mounted in the vicinity of the lower end thereof vertically and normal to either end of a horizontal angle member, means for mounting said stationary frame structure to a vehicle, a drive shaft connected to driving means rotatively disposed within said horizontal angle member, a drive sprocket member disposed on either end of said drive shaft and partially protruding into the hollow portion of said substantially U-shaped cross-sectioned support channel members, an upper sprocket member rotatively mounted on the top of each of said support channel members aligned with said corresponding drive sprocket members to form a pair of sprocket members on each support channel member, a closed loop lift link chain member disposed on each of said pair of sprocket members such that one longitudinal half of said closed loop lift link chains is disposed within the hollow portion of said support channel members, a lift channel member of smaller substantially U-shaped cross-section having side flanges connected by a rear web disposed within and longitudinally movable within each of said support channel members, anti-friction means disposed between said support channel members and said lift channel members, a pair of bearing members mounted on each of said lift channel members and extending into contact with the interior face of said rear wall of said support channel members, a tailgate lift platform member pivotally attached between the lower ends of said channel members, and lift chain attaching means connected to the upper ends of said lift channel members comprising bars mounted intermediate the side flanges of said lift channel members, said bars having outwardly directed teeth extending between the links of the lift link chain for establishing selective removable connections between said lift channel members and said lift link chains.

2. A vehicle tailgate loader mechanism as set forth in claim 1 in which said bearing members consist of spatially related disc-shaped members rotatively attached to the interior surfaces of the lift channel side flanges of said U-shaped cross-section lift channel members and adapted to roll on said interior face of said rear wall of said support channel members on either side of said closed loop lift link chains.

3. A vehicle tailgate loader mechanism as set forth in claim 1 in which said lift channel members are confined to longitudinal movement within said support channel members by detachable longitudinally extending restraining bars disposed vertically adjacent the edges of the interior faces of the side walls of said support channel members and providing guide means for the opposite longitudinal edges of the rear webs of the lift channel members.

4. A vehicle tailgate loader mechanism as set forth in claim 1 in which the ends of said teeth of said bars terminate immediately adjacent the interior face of said rear wall of said support channel members for confining the lift link chains in engagement with the chain attaching means.

5. A vehicle tailgate loader mechanism as set forth in claim 1 in which the friction angle on said teeth of said bars prevents disengagement of said lift link chains from said teeth on said bars while said bars are aligned transversely with said interior face of said rear wall of said support channel members.

References Cited in the file of this patent

UNITED STATES PATENTS

| | | |
|---|---|---|
| 1,953,056 | Olen | Mar. 27, 1934 |
| 1,983,508 | Cocker | Dec. 4, 1934 |
| 2,405,054 | Pringle | July 30, 1946 |
| 2,701,068 | Douglas et al. | Feb. 1, 1955 |
| 2,706,565 | Krasno | Apr. 19, 1955 |